United States Patent
Meagher

(10) Patent No.: US 8,125,104 B2
(45) Date of Patent: Feb. 28, 2012

(54) METHOD AND APPARATUS FOR POWER SUPPLY

(75) Inventor: Thomas Bruce Meagher, Houston, TX (US)

(73) Assignee: Rockwell Automation Limited, Malden, Essex (GB)

(*) Notice: Subject to any disclaimer, the term of this patent is extended or adjusted under 35 U.S.C. 154(b) by 286 days.

(21) Appl. No.: 12/499,983

(22) Filed: Jul. 9, 2009

(65) Prior Publication Data

US 2010/0079129 A1 Apr. 1, 2010

Related U.S. Application Data

(60) Provisional application No. 61/101,773, filed on Oct. 1, 2008.

(51) Int. Cl.
*H02J 1/00* (2006.01)
(52) U.S. Cl. ............................................. 307/75; 307/28
(58) Field of Classification Search .................... 307/75, 307/82, 28
See application file for complete search history.

(56) References Cited

U.S. PATENT DOCUMENTS

| | | | |
|---|---|---|---|
| 6,270,350 B1 * | 8/2001 | Christopher | 434/69 |
| 6,411,173 B1 * | 6/2002 | Eddy et al. | 333/25 |
| 6,795,538 B1 * | 9/2004 | Olson | 379/93.36 |
| 7,936,089 B1 * | 5/2011 | Gill et al. | 307/31 |

* cited by examiner

*Primary Examiner* — Shawn Riley
(74) *Attorney, Agent, or Firm* — Boyle Fredrickson, S.C.; William R. Walbrun; John M. Miller

(57) ABSTRACT

A power supply that is capable of supplying power to an input/output channel for an Industrial Process Control System. The power supply includes a primary voltage converter having a first voltage input and a second voltage output, and overvoltage protection components that prevent the second voltage from rising above a predetermined maximum. The power supply includes a first low dropout regulator that is connected to receive the second voltage and to generate a third voltage, a second low dropout regulator that is connected to receive the second voltage and to generate a fourth voltage, and a third low dropout regulator that is connected to receive the fourth voltage and to generate a fifth voltage. The power supply provides an over-voltage fault tolerant self-testable architecture, allows for compact low cost individual channel isolation and fault tolerant EMI/RFI filtration.

12 Claims, 9 Drawing Sheets

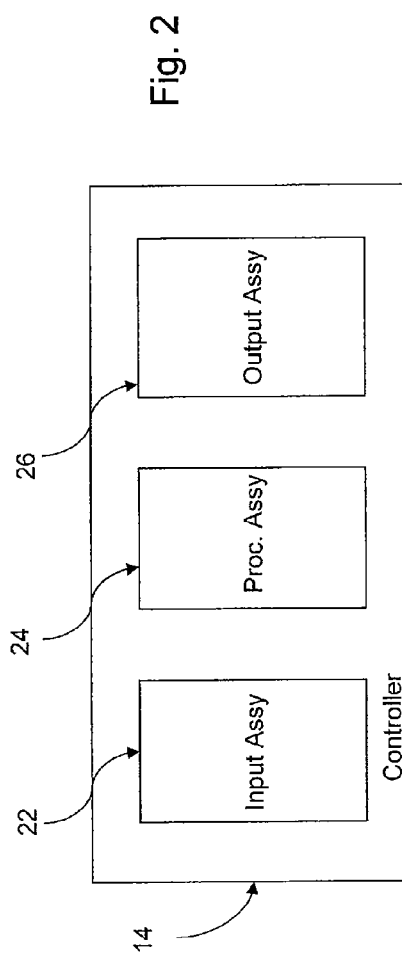
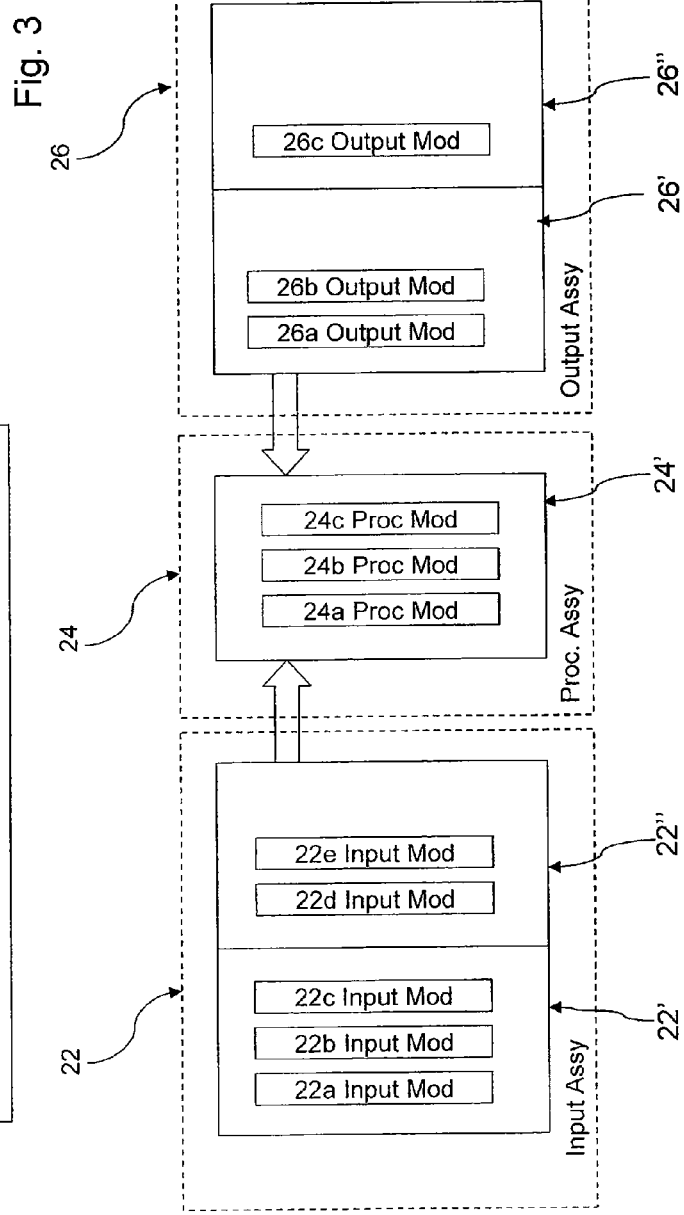

METHOD AND APPARATUS FOR POWER SUPPLY

CROSS REFERENCE TO RELATED APPLICATIONS

This application claims priority to U.S. Provisional Application No. 61/101,773 filed on Oct. 1, 2008 and European Patent Application No. 09157013.5 filed on Mar. 31, 2009, the disclosures of which are incorporated herein.

BACKGROUND a. Field of the Invention

One aspect of the invention relates to supplying power to a module for an Industrial Process Control System and for providing a power supply with over voltage protection in particular for an Industrial Process Control System suitable for:

Emergency Shutdown systems
Critical process control systems
Fire and Gas detection and protection systems
Rotating machinery control systems
Burner management systems
Boiler and furnace control systems
Distributed monitory and control systems Such control systems are applicable to many industries including oil and gas production and refining, chemical production and processing, power generation, paper and textile mills and sewage treatment plants.

b. Related Art

In industrial process control systems, fault tolerance is of utmost importance. Fault tolerance is the ability to continue functioning safely in the event of one or more failures within the system.

Fault tolerance may be achieved by a number of different techniques, each with its specific advantages and disadvantages.

An example of a system which provides redundancy is a Triple Modular Redundancy (TMR) system. Using TMR, critical circuits are triplicated and perform identical functions simultaneously and independently. The data output from each of the three circuits is voted in a majority-voting circuit, before affecting the system's outputs. If one of the triplicated circuits fails, its data output is ignored. However, the system continues to output to the process the value (voltage, current level, or discrete output state) that agrees with the majority of the functional circuits. TMR provides continuous, predictable operation.

However, TMR systems are expensive to implement if full TMR is not actually a requirement, and it is desirable to utilize an architecture which provides flexibility so that differing levels of fault tolerance can be provided depending upon specified system requirements.

Another approach to fault tolerance is the use of hot-standby modules. This approach provides a level of fault tolerance whereby the standby module maintains system operation in the event of module failure. With this approach there may be some disruption to system operation during the changeover period if the modules are not themselves fault-tolerant.

Fault tolerant systems ideally create a Fault Containment Region (FCR) to ensure that a fault within the FCR boundary does not propagate to the remainder of the system. This enables multiple faults to co-exist on different parts of a system without affecting operation.

Fault tolerant systems generally employ dedicated hardware and software test and diagnostic regimes that provide very fast fault recognition and response times to provide a safer system.

Safety control systems are generally designed to be 'fail-operational/fail-safe'. Fail operational means that when a failure occurs, the system continues to operate: it is in a fail-operational state. The system should continue to operate in this state until the failed module is replaced and the system is returned to a fully operational state.

An example of fail safe operation occurs, for example if, in a TMR system, a failed module is not replaced before a second failure in a parallel circuit occurs, the second failure should cause the TMR system to shut down to a fail-safe state. It is worth noting that a TMR system can still be considered safe, even if the second failure is not failsafe, as long as the first fault is detected and annunciated, and is itself failsafe.

This invention relates to improved power supplies within a controller controlling an industrial process control system.

It is advantageous if input or output modules for an industrial process control system are powered with their own independently isolated power supplies. It is desired that the method for generating the isolated power supply for each channel require a minimum number of isolation components. This has benefits in the areas of cost and flexibility. If individual channel isolation supplies of an input module are excited independently then each channel power supply converter may be driven at a unique frequency or phase, providing a reduction in peak radiated and conducted EMI/RFI emissions.

Ideally, critical systems will be protected from over-voltage faults in the components of their power supplies. Preferably a method of overvoltage protection will provide for the detection of the over-voltage faults, while permitting the system to continue to operate. Ideally any power supply overvoltage fault circuitry is testable in order to detect any faults.

Preferably common mode noise spikes are suppressed within a power supply.

SUMMARY OF THE INVENTION

According to one aspect of the invention, there is provided a power supply that includes a primary voltage converter having a first voltage input and a second voltage output, and overvoltage protection components preventing said second voltage rising above a predetermined maximum. A first low dropout regulator is connected to receive said second voltage and to generate a third voltage. A second low dropout regulator is connected to receive said second voltage and to generate a fourth voltage and a third low dropout regulator is connected to receive the fourth voltage and to generate a fifth voltage.

In one embodiment said first voltage is greater than said second voltage; said second voltage is greater than said third voltage; said third voltage is greater than said fourth voltage; and said fourth voltage is greater than said fifth voltage.

The overvoltage protection components may comprise a series fuse and a parallel avalanche diode.

The power supply accordingly may further comprise a microprocessor connected to each of said low dropout regulators and to said primary voltage converter. The microprocessor is arranged in operation to send a test signal and an enable signal to each low dropout regulator and to receive a monitored voltage from each low dropout regulator and further arranged in operation to apply the test signal to cause a small perturbation in a voltage received by one of said low dropout regulators and said primary voltage converter. The microprocessor monitors the resulting generated voltages and shuts down any one of said low dropout regulators by use of said enable signal.

The primary voltage converter may utilize a capacitor network comprising two parallel sets of two series capacitors to suppress the propagation of parasitic noise spikes at their source.

According to another aspect of the invention combinable with one or more of the above aspects, there is also provided a power supply for a channel of an input/output module comprising: a field programmable gate array for generating a pair of complementary square waves on two output pins and a transformer comprising two inputs connected to receive each of said pair of complementary square waves.

In this aspect, a pair of clamping diodes may be connected to each output pin.

The power supply may also comprise a damping resistor in series with each transformer input.

According to another aspect of the invention combinable or useable with one or more of the above aspects, there is provided a power supply system comprising a plurality of power supplies for a plurality of channels of an input/output module and in which each power supply is arranged in operation to generate a pair of complementary square waves at a different frequency to the frequency at which each other pair of complementary square waves is generated.

BRIEF DESCRIPTION OF THE DRAWINGS

Embodiments of the invention will now be described, by way of example only, with reference to the accompanying drawings, in which:

FIG. 2 illustrates schematically a controller of the industrial process control system illustrated in FIG. 1;

FIG. 3 illustrates a possible configuration of a controller;

DETAILED DESCRIPTION

Figure 1:
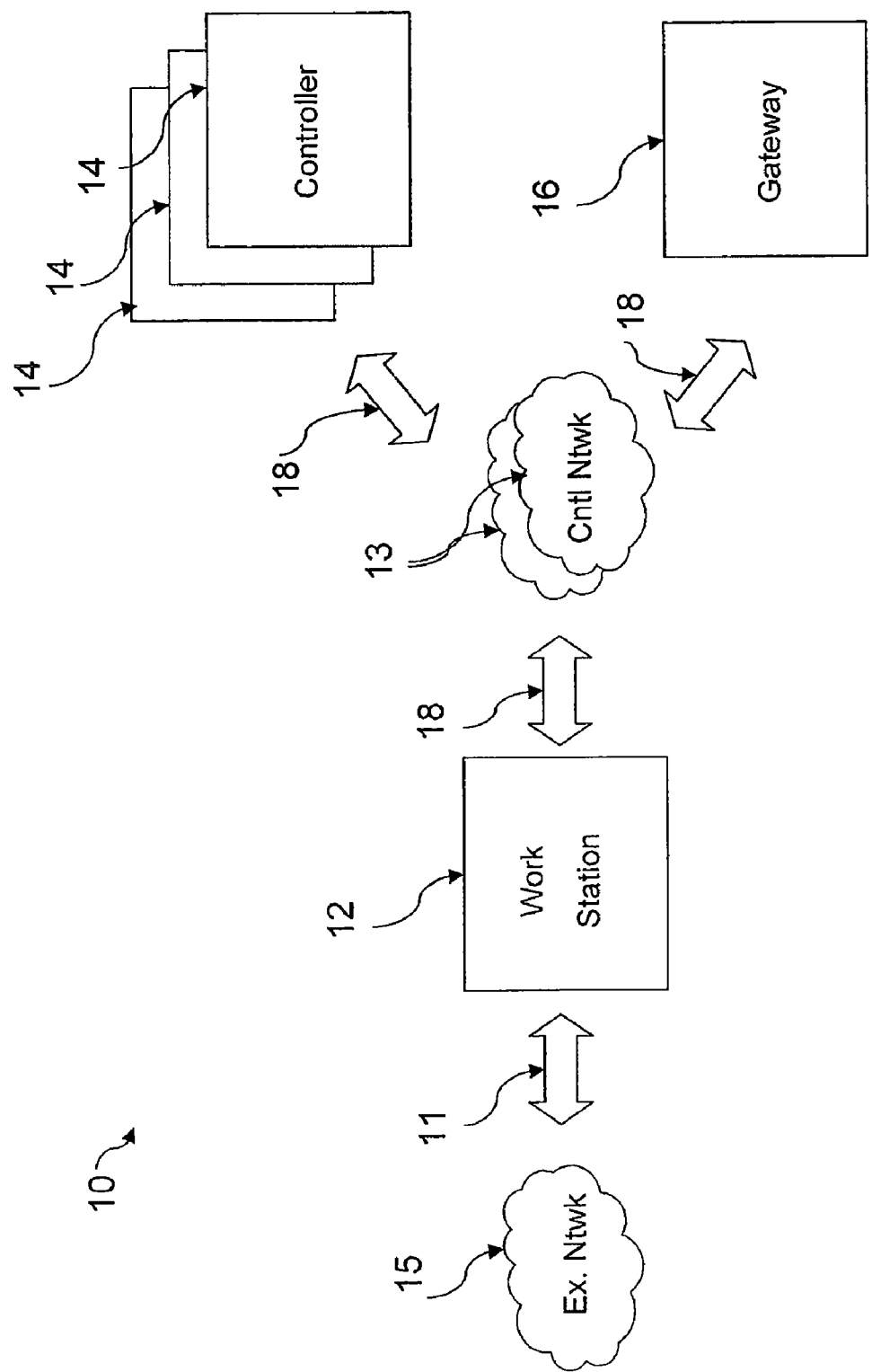
FIG. 1 is an illustration showing the architecture of a distributed industrial process control system which uses the apparatus and method of the present invention.

In the Industrial Process Control System shown in FIG. 1, a distributed architecture is designed to be used in different SIL environments, so that if a high SIL is required it can be provided, but if a low SIL is all that is needed, the system can be reduced in complexity in order to reduce unnecessary costs.

An exemplary Industrial Process Control System 10, comprises a workstation 12 one or more controllers 14 and a gateway 16. The workstation 12 communicates with the controllers 14 and the gateway 16 via Ethernet connections 18 to one or more control networks 13. Multiple Ethernet connections 18 provide redundancy to improve fault tolerance. The workstation 12 may be connected via a conventional Ethernet connection 11 to another external network 15.

A controller 14 will now be described in more detail with reference to FIGS. 2 and 3.

FIG. 2 illustrates a schematic diagram of the controller 14 comprising an input assembly 22, a processor assembly 24 and an output assembly 26. In this schematic illustration the input assembly 24 and output assembly 26 are on different backplanes but they may equally well share a single backplane.

Assemblies 22, 24, 26 are created from one or more communications backplane portions which have three slots to accommodate up to three modules together with termination assemblies which have one, two, or three slots, and which interface to field sensors and transducers. A termination assembly may straddle two contiguous backplane portions. A module comprises a plug in card with multiple connectors for plugging onto a communications backplane and a termination assembly.

It will be appreciated that having three slots in a communications backplane portion is one design option and other design options with greater (or fewer) slots are possible without departing from the scope of the invention as defined in the appended claims.

FIG. 3 illustrates a possible physical configuration of the controller 14. In this embodiment of the invention, the input assembly 22, output assembly 26 and processor assembly 24 are physically separated from one another by grouping the modules of different types onto separate communications backplanes.

In the example shown, the input assembly 22 comprises two communications backplane portions, 22', 22". The first backplane portion 22' has a triplex input termination assembly and three input modules 22a, 22b, 22c, the second backplane portion 22" has a duplex input termination assembly 22" and two input modules 22d, 22e. The processor assembly 24 comprises a single processor backplane portion 24' having three processor modules 24a, 24b and 24c. The output assembly 26 comprises two backplane portions 26', 26". The first backplane portion 26' has a duplex output termination assembly with two output modules 26a, 26b and the second backplane portion 26" has a simplex output termination assembly with a single output module 26c.

Figure 4:
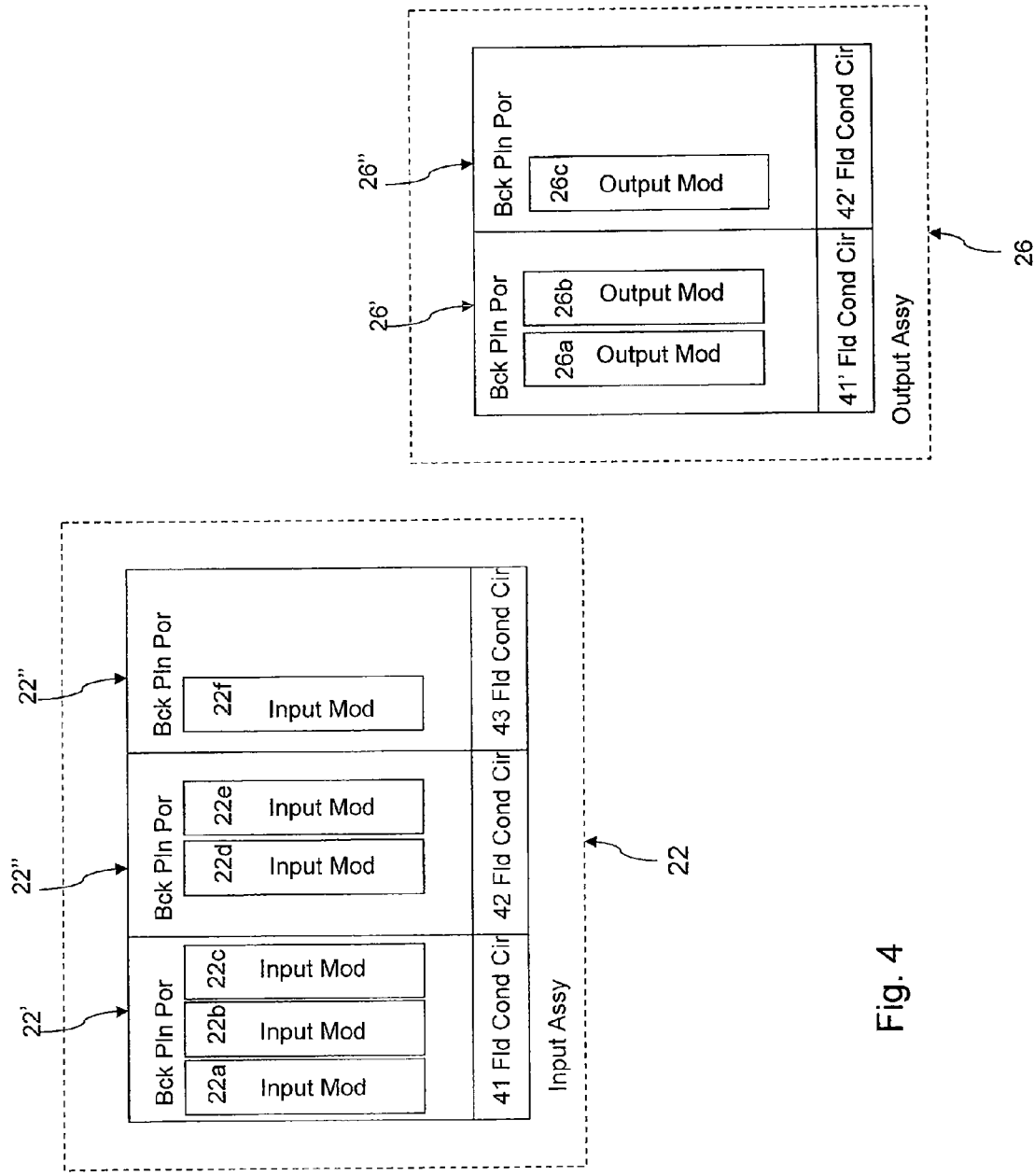
FIG. 4 shows various options for an input assembly and output assembly of associated with the controller shown in FIG. 3.

The flexibility of the input assembly 22, will now be described, in more detail with reference to FIG. 4.

An input assembly 22 comprises one or more backplane portions and termination assemblies 22' 22" 22'" etc. For example, a triplex portion 22' having three modules 22a, 22b, 22c might be used for high availability requirement, a duplex portion 22" having two modules 22d, 22e might be provided for fault tolerant applications and a simplex portion 22'" with a single module 22f might be provided for failsafe applications. The termination assemblies may be provided with different types of field conditioning circuits. For example assembly 22' may be provided with a 24V DC field conditioning circuit 41, assembly 22" may be provided with a 120V DC field conditioning circuit 42, and assembly 22'" may be provided with a 4-20 mA field conditioning circuit 43. Similarly possible configurations are shown for an output assembly 26. It will be appreciated that numerous configurations of backplane portions and termination assemblies with various different numbers of modules and various different types of field conditioning circuits are possible and the invention is not limited to those shown in these examples.

Where an assembly provides more than one module for redundancy purposes it is possible to replace a failed module with a replacement module whilst the industrial process control system is operational which is also referred to herein as online replacement (i.e. replacement is possible without having to perform a system shutdown). Online replacement is not possible for a simplex assembly without interruption to the process. In this case various "hold last state" strategies may be acceptable or a sensor signal may also be routed to a different module somewhere else in the system.

The processor assembly configures a replacement processor module using data from a parallel module before the replacement module becomes active.

The field conditioning circuits 41, 42, 43 transform a signal received from a sensor monitoring industrial process control equipment to a desired voltage range, and distribute the signal to the input modules as required. Each field conditioning circuit 41, 42, 43 is also connected to field power and field return (or ground) which may be independently isolated on a channel by channel basis from all other grounds, depending on the configuration of the input termination assembly. Independent channel isolation is the preferred configuration because it is the most flexible. The field conditioning circuits 41, 42, 43 comprise simple non active parts and are not online replaceable.

Figure 5:
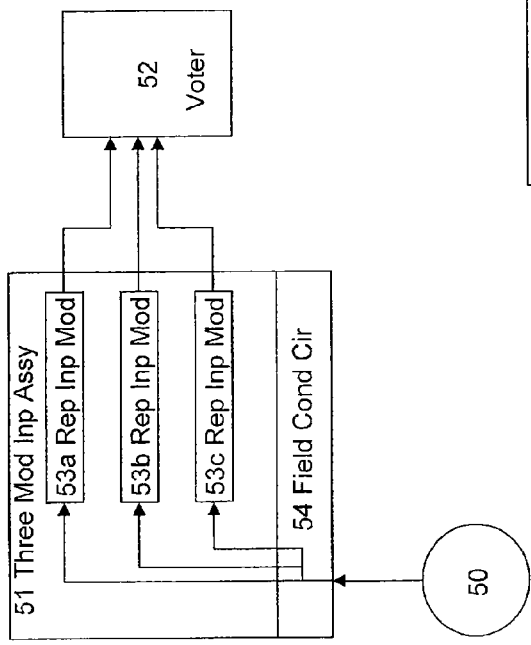
FIG. 5 shows one possible configuration implementing a two out of three voting strategy.
Figure 6:
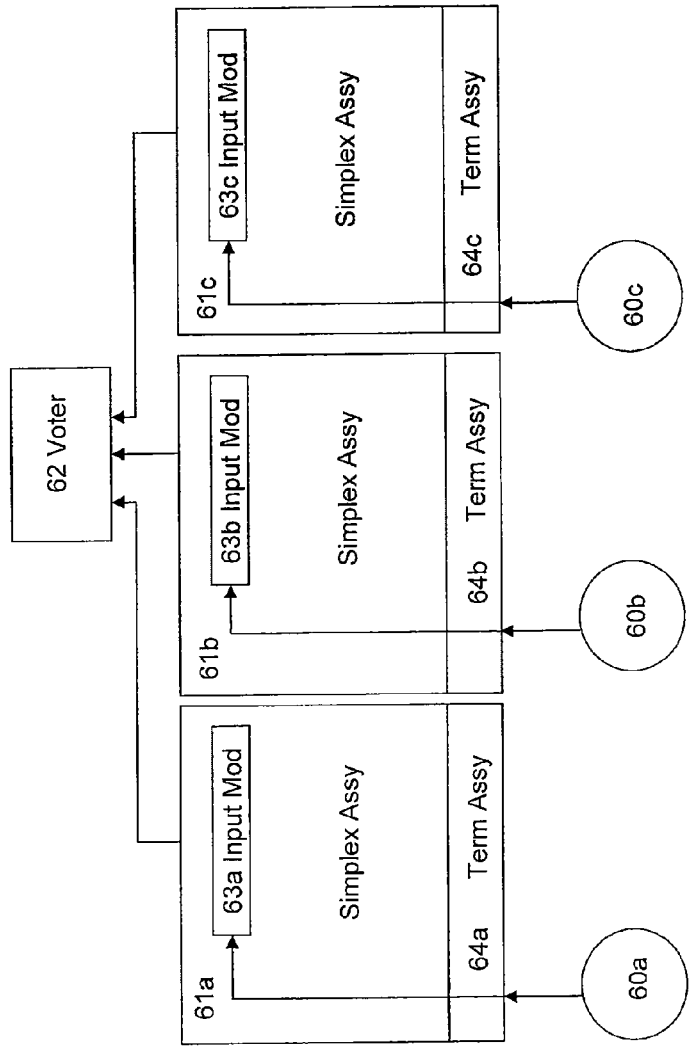
FIG. 6 illustrates a second possible configuration for a two out of three voting strategy.

FIG. 5 and FIG. 6 illustrate the flexibility of the architecture described herein showing different configurations for a triplex system for generating a signal with a high availability requirement. Referring to FIG. 5, a three module input assembly 51 receives a signal from a sensor 50 via a field conditioning circuit in termination assembly 54. The field conditioning circuit 54 transforms the signal to a desired voltage range and distributes the signal to three replicated input modules 53a, 53b, 53c. Each input module processes the signal and the results are sent to a two out of three voter 52 to generate a result signal in dependence thereon.

Referring to FIG. 6, replicated sensors 60a, 60b, 60c each send a signal to a respective simplex assemblies 61a, 61b, 61c via respective field conditioning circuits in termination assemblies 64a, 64b, 64c. Each input module 63a, 63b, 63c processes the signal and sends an output to a two out of three voter 62 to generate a signal in dependence thereon. It will be appreciated that many variations and configurations are possible in addition to those illustrated here.

Figure 7:
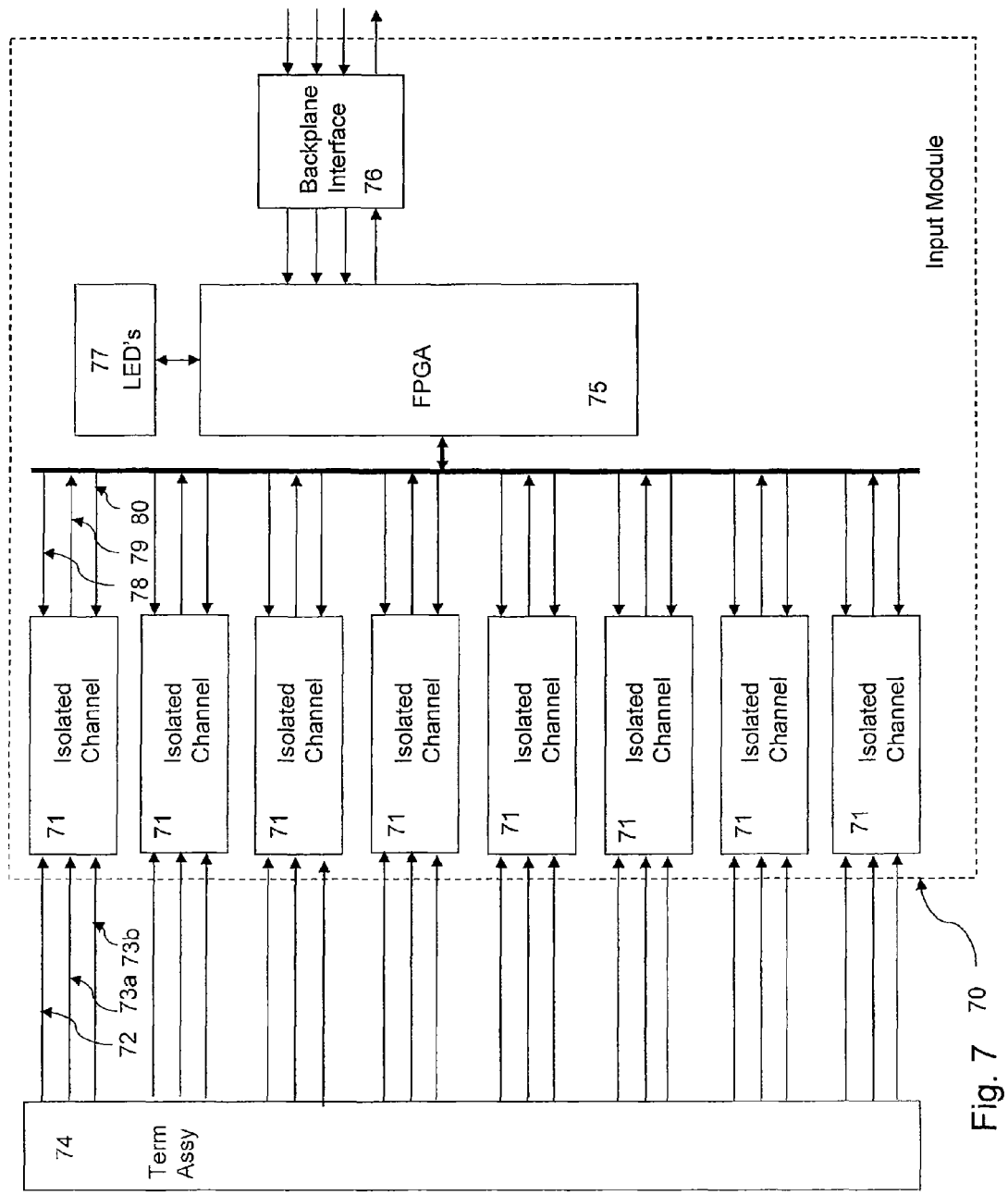
FIG. 7 is a schematic illustration showing an input module.

FIG. 7 illustrates schematically an input module 70 in accordance with the present invention:

An input module 70 comprises eight isolated channels 71. Each channel 71 receives signals 72, 73a, 73b from field conditioning circuits in a termination assembly 74. Each channel communicates with a field programmable gate array (FPGA) 75 which interfaces to an backplane (not shown) via a non-isolated backplane interface 76. Light emitting diodes (LEDs) 77 are used to indicate status of the module via red and green indicators.

It will be appreciated that having eight channels is one design option and other design options with greater (or fewer) channels are possible without departing from the scope of the invention as defined in the appended claims.

Programmable I/O pins of the FPGA 75 are used to directly drive low power isolated supplies, supplying the channels 71 without the need for additional power amplifiers.

Figure 8:
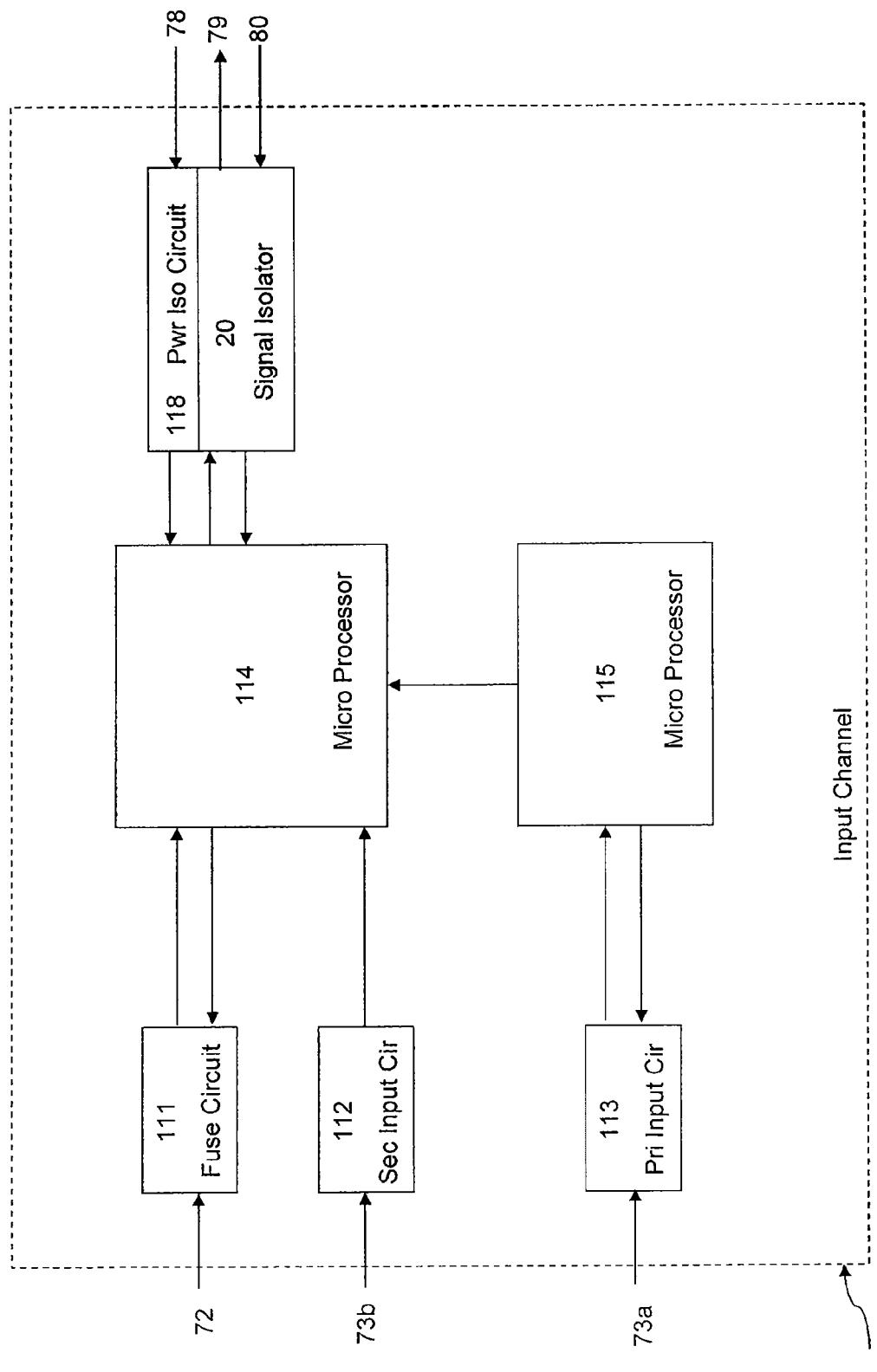
FIG. 8 is a block diagram of a channel of an input module.

Referring now to FIG. 8 the channel 71 is shown in more detail.

The input channel 71 comprises a blown fuse circuit 111 receiving blown fuse signal 72, a primary input circuit 113 receiving primary sense signal 73a and a secondary input circuit 112 receiving secondary sense signal 73b. The input channel also comprises microcomputers 114 and 115 for processing signals 72, 73a and 73b.

The input channel 71 further comprises a power isolator circuit 118 receiving power inputs 78 from the FPGA 75 which will be described in more detail below. The signal isolator 20 receives a command signal 80 and returns a response signal 79 which are routed to and from the microprocessor 114. The signal isolator 120 is not discussed further here.

Isolated power for each input channel 71 is created with direct drive from pins of the FPGA 75 by complementary square wave signals 78. Multiple pins of the FPGA may be paralleled to provide greater drive current capability.

Figure 9:
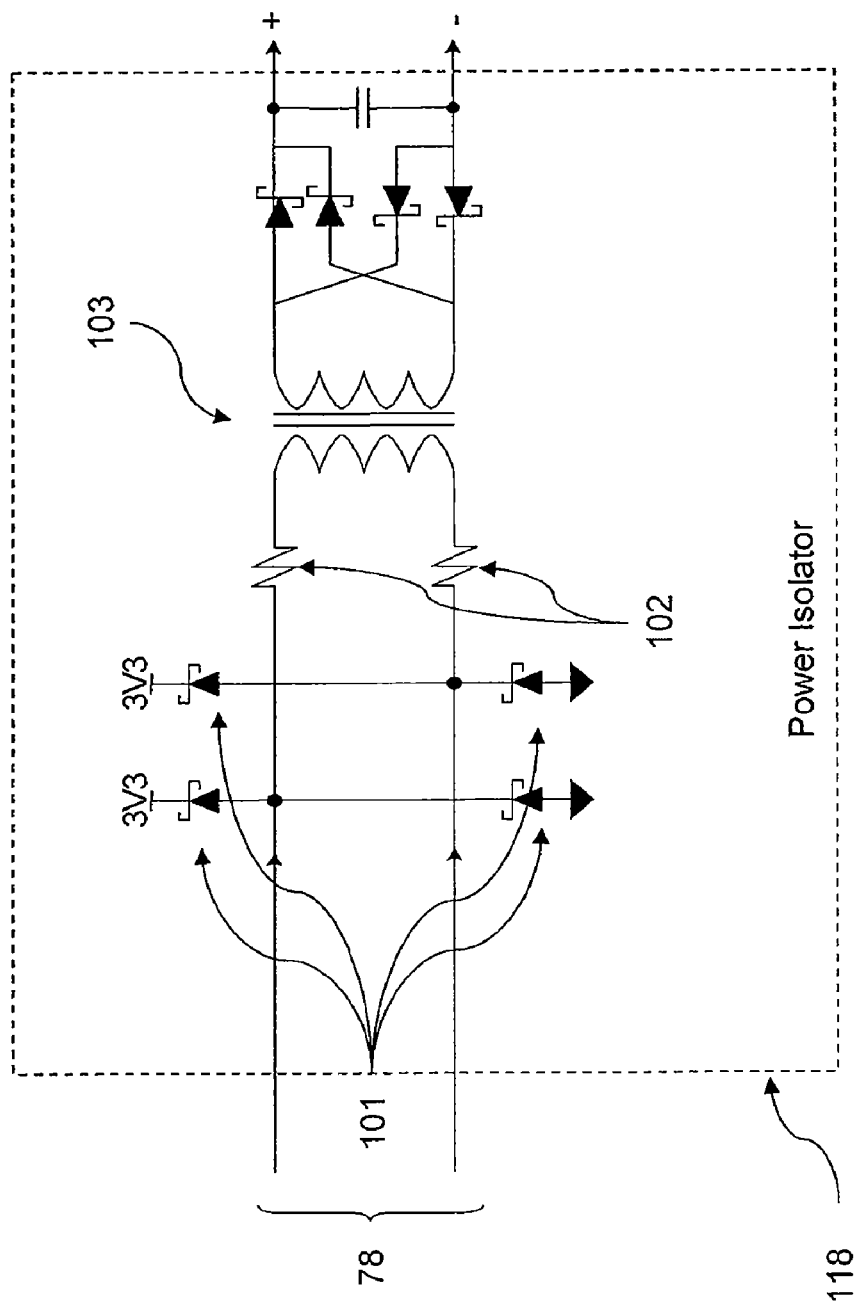
FIG. 9 is a circuit diagram of a power isolator.

FIG. 9 shows the power isolator 118 in more detail. The signals 78 are input into a transformer 103 (which in the preferred embodiment is an ultra miniature 1:1 or 1:1.5 isolation transformer). Clamping diodes 101 are used to ensure that the output pins of the FPGA 75 are protected from switching transient spikes from the leakage inductance of the transformer 103.

Low value damping resistors 102 may be used to absorb ringing from any switching transients.

The advantages of this approach are the small size, low cost, and small number of components that are required to generate the isolated supply. In a preferred embodiment of the invention, multiple isolated channels 71 are driven with square wave signals having slightly different excitation frequencies or phases to distribute the EMI/RFI peak amplitudes, which provides improved radiated and conducted emissions performance.

All of the input and output modules require a power supply which is protected from overvoltage faults.

Figure 10:
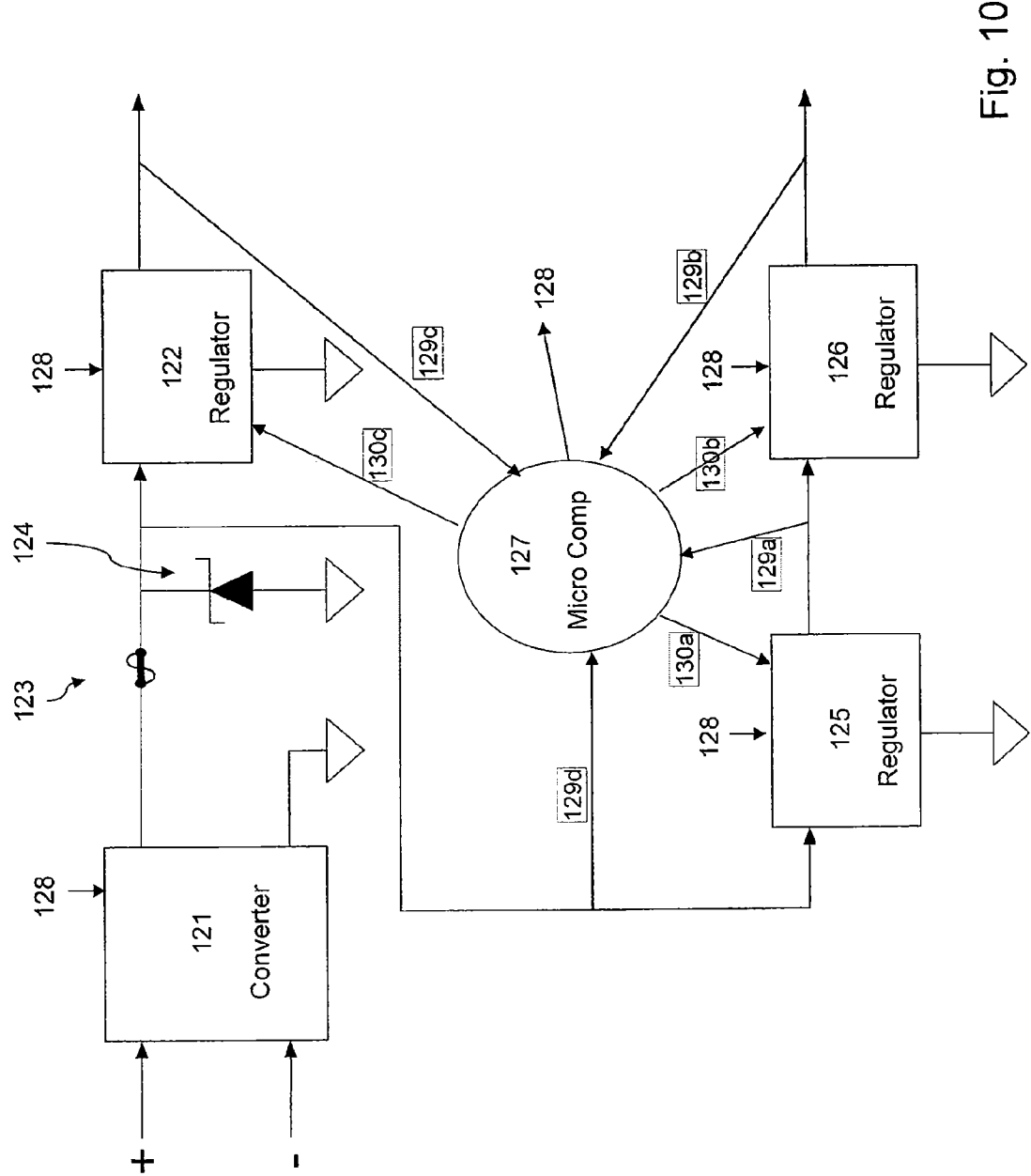
FIG. 10 illustrates an exemplary power supply in accordance with the present invention.

FIG. 10 is an illustration of a power supply for providing two voltages to an input or output module. The supply is protected from over-voltage faults in such a manner that over-voltage faults can be detected and tolerated as will now be described.

A primary DC/DC converter 121 provides a 3.4V+/−1% output from a 24V input. This output is not directly protected from an over-voltage fault. However, low dropout linear regulators 122 and 125 discussed below protect downstream circuitry from an over-voltage fault on the DC/DC converter 121.

A low dropout linear regulator 122 receives this output where it is regulated down to 3.2V+/−1%. If the low dropout regulator 122 develops an input-to-output short-circuit fault, the worst case fault, then the output supplied cannot rise above 3.4V, which is still within the acceptable recommended operating range for 3.3V+/−5% integrated circuitry.

Extreme over-voltage fault protection components, consisting of a series fuse 123 and transient over-voltage protection avalanche diode 124, are provided for the case where the DC/DC converter 121 develops an output fault condition where the output would otherwise rise above the tolerance level of the low dropout regulators 122 and 125.

A further over-voltage protected output voltage is provided by the combination of a further low dropout regulator 125 providing 1.3V+/−1% from the 3.4V source and an ultra-low dropout regulator 126. In this example the ultra low dropout regulator 126 provides 1.2V+/−1% from the 1.3V source voltage provided by the further low dropout regulator 125, at an amount of current that is adequate to supply an FPGA core, so that there is no possible short circuit fault that will result in more than 1.3V being applied to an FPGA core and resulting in un-predictable operation.

A supervisor micro-computer 127 is responsible for enabling the regulators 122, 125, 126 in sequence after the output from the DC/DC converter 121 has stabilized. This provides a confidence level in the functionality of the linear supplies.

The supervisor micro-computer 127 may generate a test signal 128 to the converter 121 and/or regulators 122, 125, 126 to coerce the generated voltages by +/−0.5%, allowing the linear operation of the linear regulators to be verified by monitoring the generated voltages via monitor signals 129a, 129b, 129c, 129d.

This test can be performed either just at power-up, or periodically during normal system operation if desired. The supervisor micro-computer 127 is also responsible for monitoring the over/under-voltage operation of the linear regulators, and shutting the system down using enable signals in the event of an out-of-tolerance fault using enable signals 130a, 130b, 130c.

An alternative to protecting power supplies from over-voltage faults is to sense the over-voltage condition with a comparator and then "crowbar" the output to deliberately create a short circuit fault which must blow the fuse, but saves the system from the consequences of an over-voltage event. Obviously this alternative would be difficult to test and maintain.

The advantage of the arrangement of the present is that un-testable crowbar circuits are not required, with their large and un-testable components.

With an isolated DC/DC power supply such as 121 shown in FIG. 10 it is desirable to provide noise filtering.

Figure 11:
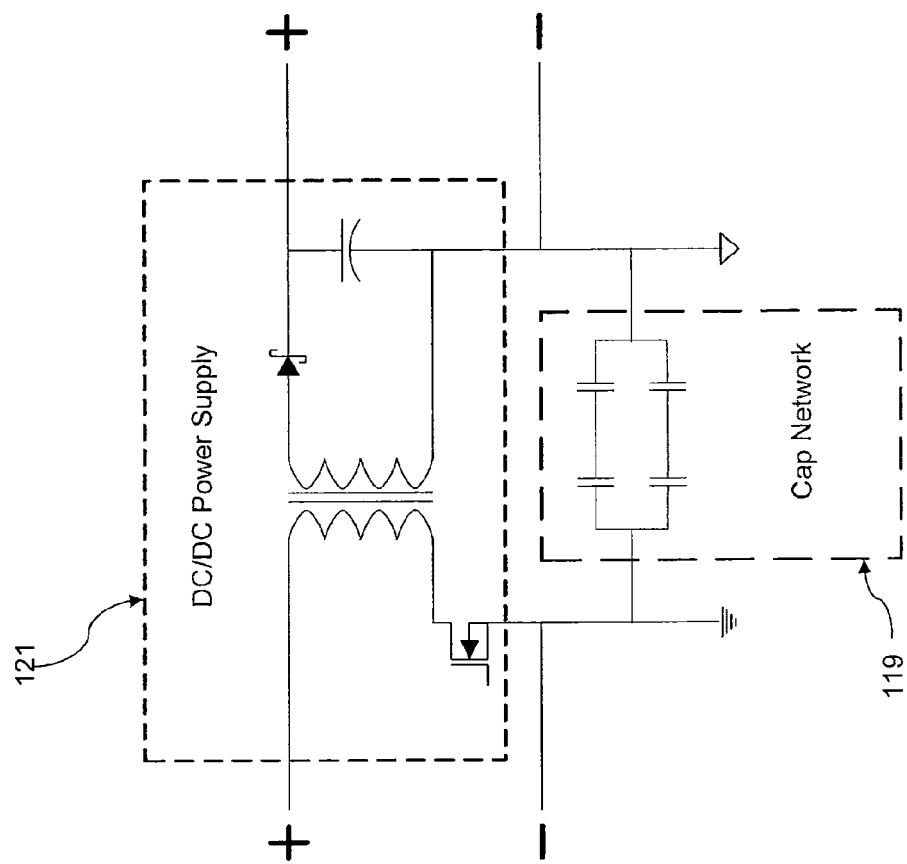
FIG. 11 illustrates a noise filtered power supply.

FIG. 11 illustrates a power supply protection circuit in accordance with the present invention. A capacitor network 119 provides a low impedance path for any high frequency noise spikes due to the interaction of a primary winding being driven by a switching power supply controller, and the primary-secondary coupling parasitic capacitances of a flyback transformer.

Filter capacitors in the network 119 are sized so that the individual capacitors can withstand the necessary isolation voltage, and the series combination of two of them (half that of a single one) provides enough filtration. The resulting system can withstand a short circuit or open circuit fault of either of the capacitors.

It will be appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the scope of the present invention as defined in the appended claims.

The invention claimed is:

1. A power supply comprising:
a primary voltage converter having a first voltage input and a second voltage output, and overvoltage protection components preventing said second voltage rising above a predetermined maximum;
a first low dropout regulator connected to receive said second voltage and to generate a third voltage;
a second low dropout regulator connected to receive said second voltage and to generate a fourth voltage; and
a third low dropout regulator connected to receive said fourth voltage and to generate a fifth voltage.

2. The power supply according to claim 1, in which
said first voltage is greater than said second voltage;
said second voltage is greater than said third voltage;
said third voltage is greater than said fourth voltage; and
said fourth voltage is greater than said fifth voltage.

3. The power supply according to claim 1, in which said overvoltage protection components comprise a series fuse and a parallel avalanche diode.

4. The power supply according to claim 1 further comprising a microprocessor connected to each of said low dropout regulators and to said primary voltage converter, the microprocessor arranged in operation to send a test signal and an enable signal to each low dropout regulator and to receive a monitored voltage from each low dropout regulator and further arranged in operation to:
apply the test signal to cause a perturbation in a voltage received by one of said low dropout regulators and said primary voltage converter;
monitor the resulting generated voltages; and
shut down any one of said low dropout regulators by use of said enable signal.

5. The power supply according claim 1, further comprising a capacitor network that includes two parallel sets of two series capacitors that protect a system connected to the power supply from parasitic switching spikes generated by the primary voltage converter.

6. A power supply for a channel of an input/output module comprising:
a field programmable gate array for generating a pair of complementary square waves on two output pins;
a transformer comprising two inputs connected to receive each of said pair of complementary square waves;
the power supply associated with each of a plurality of channels of a power supply system, each input module having a plurality of channels and in which each power supply is arranged in operation to generate a pair of complementary square waves at one of a different frequency or phase to the frequency phase at which each other pair of complementary square waves is generated.

7. The power supply according to claim 6, further comprising a pair of clamping diodes connected to each output pin.

8. The power supply according to claim 6, further comprising a damping resistor in series with each transformer input.

9. The power supply of claim 6 further comprising a first voltage converter and a second voltage converter.

10. The power supply of claim 9 further comprising a first low dropout regulator connected to receive an output from the second voltage converter.

11. The power supply of claim 10 further comprising a second low dropout regulator connected to receive an output from the first low dropout regulator.

12. The power supply of claim 11 further comprising third low dropout regulator connected to receive an output from the second low dropout regulator.

* * * * *